United States Patent [19]

Goff, Jr. et al.

[11] 4,450,342

[45] May 22, 1984

[54] THERMAL PRINT HEAD

[75] Inventors: Willie Goff, Jr., Austin; James M. Rakes, Leander; Errol R. Williams, Round Rock, all of Tex.

[73] Assignee: International Business Machines Corporation, Armonk, N.Y.

[21] Appl. No.: 452,994

[22] Filed: Dec. 27, 1982

[51] Int. Cl.³ ........................ H05B 3/00; G01D 15/10; B41J 3/20

[52] U.S. Cl. ................................ 219/216; 346/76 PH

[58] Field of Search ............ 219/216 PH; 346/76 PH; 400/120; 101/93.04

[56] References Cited

U.S. PATENT DOCUMENTS

| | | | |
|---|---|---|---|
| 3,453,647 | 7/1969 | Bernstein et al. | 346/76 |
| 3,953,708 | 4/1976 | Thornburg | 219/216 |
| 3,955,068 | 5/1976 | Shaheen | 219/549 |
| 3,984,844 | 10/1976 | Tanno | 219/216 PH |
| 4,030,408 | 6/1977 | Miwa | 101/1 |
| 4,039,065 | 8/1977 | Seki et al. | 197/1 R |
| 4,074,109 | 2/1978 | Baraff | 219/216 PH |
| 4,091,391 | 5/1978 | Kozima | 219/216 PH |
| 4,099,046 | 7/1978 | Boynton et al. | 219/216 |
| 4,136,274 | 1/1979 | Shibata et al. | 219/216 |
| 4,203,119 | 5/1980 | Naguib et al. | 346/76 PH |
| 4,216,481 | 8/1980 | Hakoyama | 219/216 PH |
| 4,217,480 | 8/1980 | Livermore | 219/216 PH |
| 4,242,565 | 12/1980 | Schoon | 219/216 |
| 4,250,375 | 2/1981 | Tsutsumi et al. | 219/216 |
| 4,399,444 | 8/1983 | Moriguchi | 219/216 PH |

*Primary Examiner*—B. A. Reynolds
*Assistant Examiner*—Teresa J. Walberg
*Attorney, Agent, or Firm*—Andrea P. Bryant

[57] ABSTRACT

A thermal print head includes a pair of parallel bars of resistive material. A first set of lines is connected to one bar at equal spacings, a second set is similarly connected to the other bar. Each line of a third set of lines is connected to both bars between the connections of the lines of the other sets. From each line of the third set there are four resistance paths along the bars to adjacent lines of the first and second sets. Each of these paths can be selected to heat the bars along the selected paths to create marks on a paper sheet or web.

7 Claims, 3 Drawing Figures

THERMAL PRINT HEAD

DESCRIPTION

RELATED APPLICATION

Patent Application No. 452,988 filed Dec. 27, 1982, in the names of J. M. Rakes and E. R. Williams and assigned to the assignees of the present application relates to a drive system which may be employed with the subject print head.

TECHNICAL FIELD

This invention relates to thermal printing, and in particular to a print head system for such printing.

BACKGROUND ART

The art of thermal printing has been established for many years. In general the principle employed is to operate a heating element to cause it to mark a sheet of heat-sensitive paper or to cause transfer of a mark from a transfer sheet to a paper sheet. Characters are formed from a combination of such marks, or in some cases by shaping the elements in character configuration.

Most of the devices in the art employ discrete elements, either in a line or a matrix formation. Examples of such devices are shown in U.S. Pat. Nos. 3,453,647 (Bernstein et al), 3,953,708 (Thornburg), 3,955,068 (Shaheen), 4,030,408 (Miwa), 4,039,065 (Seki et al), 4,136274 (Shibata et al), 4,203,119 (Naguib et al), 4,242,565 (Schoon), and 4,250,375 (Tsutsumi et al). As the requirements for high quality printing, by using smaller dot or mark sizes, goes up, these systems offer greater problems. Firstly, as each element has to be insulated from adjacent elements, the space required between elements becomes more significant and limits the number of elements per unit length or area. Secondly, the number of drive lines must be equal to at least the number of elements plus one, in the case in which there is a common earth drive to each element, and it may be as great as twice the number of elements. Though modern manufacturing techniques can produce extremely dense circuit patterns, it must be remembered that in the production of heat, relatively large currents are employed, so the cross-sectional area of the drive lines can not fall below minimum, this reduces the minimum density of circuit packaging and, therefore, limits the density of elements.

U.S. Pat. No. 4,099,046 (Boynton et al) shows an arrangement in which one of the disadvantages of the prior systems is avoided. In this arrangement a continuous bar of resistive material is employed. Connections are made to respective sides of the bar from connectors which are staggered on one side of the bar relative to the other side. Thus each printing element is defined by the resistive material between a connection on one side of the bar and an adjacent connection on the other side of the bar. The elements, therefore are defined in a zig-zag formation along the bar. Though this arrangement avoids the necessity of insulating the printing elements one from another, it does require the number of leads to be equal to the number of elements plus one. In addition, as the connections are made to the sides of the bar, in fact to small areas below the bar, their size is limited, which can cause problems when relatively high currents are involved.

It is, therefore, an object of the invention to provide a thermal print head in which the disadvantages of the prior print heads are substantially reduced.

It is a further object of the invention to provide a thermal print head in which the required number of connections are reduced as compared with prior print heads.

According to the invention, there is provided a thermal print head comprising first and second longitudinally extending, electrically resistive, continuous print bars positioned in parallel, a first and a second set of leads connected to the first and second bars respectively, each lead being individually connected to the associated bar at a position substantially equidistant from the connection positions of immediately adjacent leads, and a third set of leads of which each lead is individually connected to both bars at a position substantially midway between adjacent connections from leads of the first and second sets.

BEST MODE FOR CARRYING OUT THE INVENTION

Figure 1:
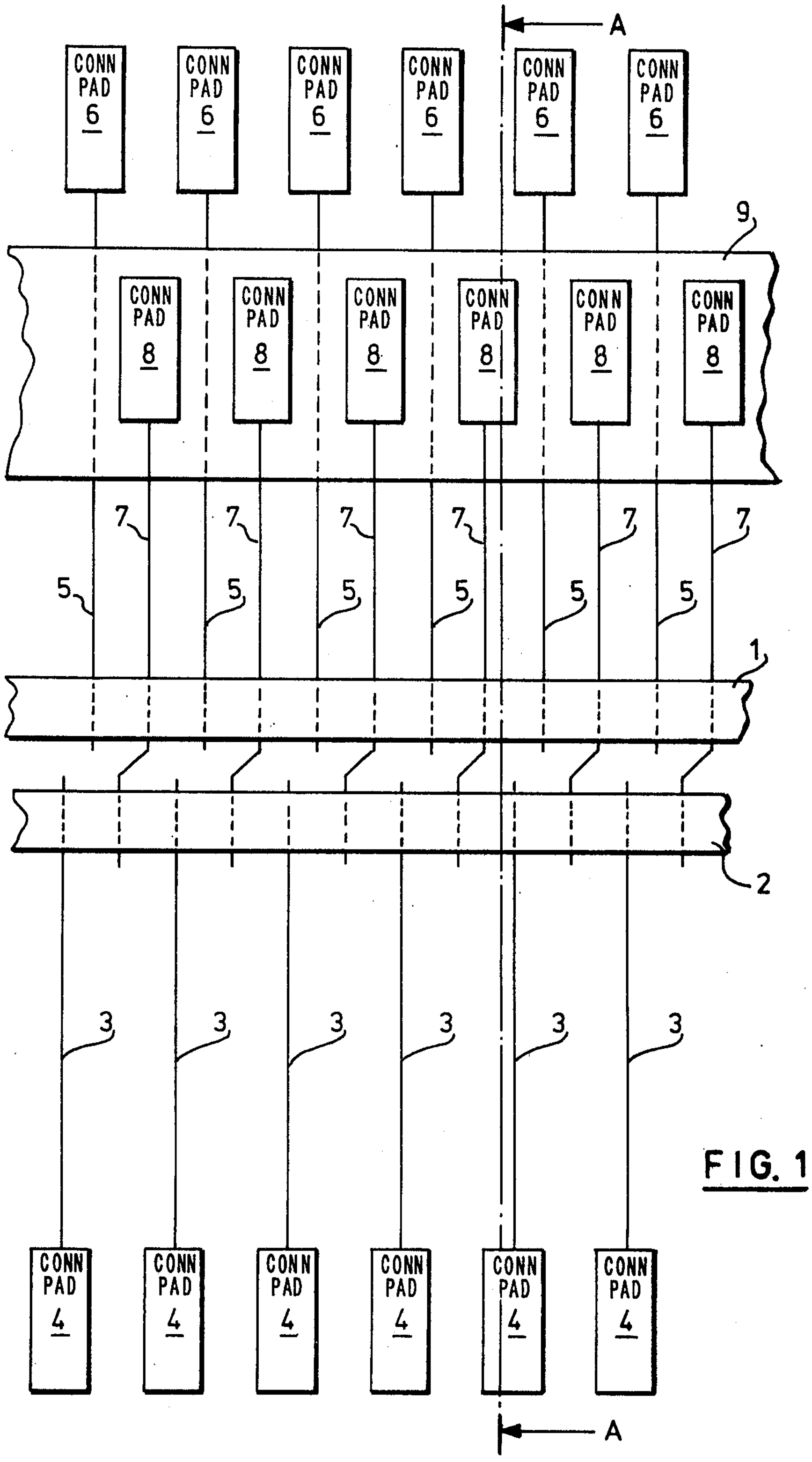
FIG. 1 is a plan view of a portion of a thermal print head embodying the invention.

FIG. 1 shows a portion of a print head embodying the invention. It is a greatly magnified view and not to scale. Two print bars 1 and 2 of resistor material form the print elements. These bars are positioned in parallel and extend across a printer. They are of a length equal to the width of a maximum size sheet accommodated by the printer. Lines 3 underlie print bar 2 and are electrically connected thereto. These lines extend from the print bar to connector pads 4. Similarly, lines 5 connect print bar 1 to connector pads 6. An insulating layer 9 overlies a portion of each of lines 5 and carries a plurality of connector pads 8. Each connector pad is connected to a line 7 which underlies, and is connected to, both print bars 1 and 2. It will be noted that between the print bars, each line 7 is skewed, this enables all of the lines 3, 5 and 7 to be spaced one from the other by a maximum amount. It is to be understood, however, that a construction without this skew is quite practicable.

Figure 2:
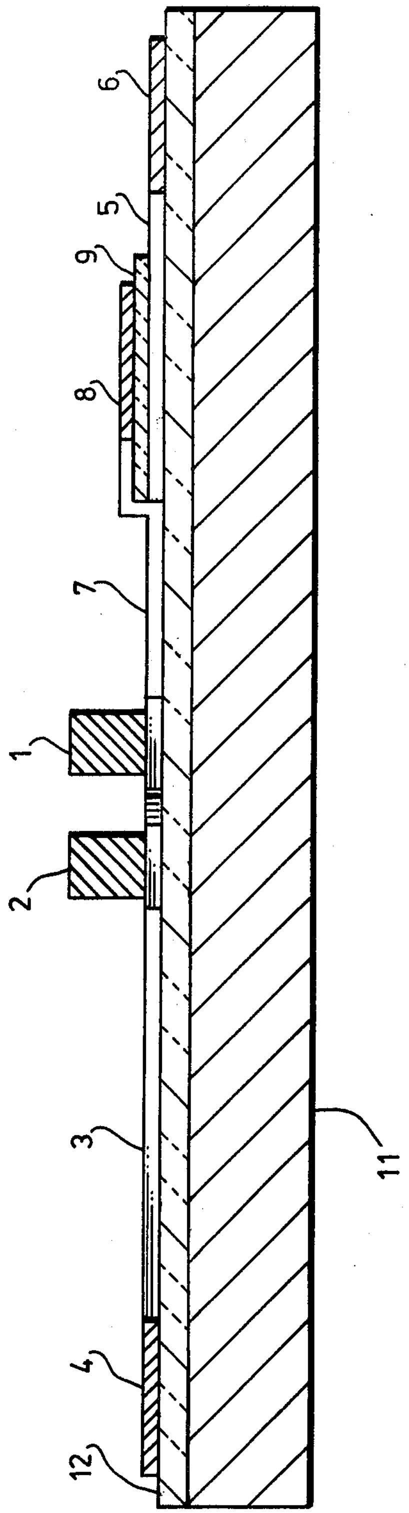
FIG. 2 is a cross-sectional view taken through the line A—A of FIG. 1.

FIG. 2 is a cross-sectional view through the line A—A of FIG. 1. This shows that the print head is built on to a ceramic substrate 12, which itself supported by an aluminum backing plate 11. In manufacture, lines 3 and 5 and connector pads 4 and 6 are placed on to the ceramic substrate by a screening process, and at the same time a portion of lines 7 extending from the point below the print bar position to a point above the upper print bar (FIG. 1) is also placed on the substrate. Next, insulant 9, in the form of a glass layer, is laid over leads 5. Thereafter, pads 8 are formed on layer 9 together with the remainder of leads 7 which extend to complete the lead 7 connections to the print bars. Lastly, the print bars are mounted over the leads.

When the head is mounted in a printer, flexible cable connections are made between the connector pads 4, 6 and 8 and printer drive circuits.

As indicated above, FIGS. 1 and 2 are highly magnified. In practice, a print head has been constructed with print bars 203 mm in length and with a spacing of 0.19 mm between their center lines. Adjacent connections to the print bars, that is, for example, the connections from lines 5 and 7 in FIG. 1 were 0.25 mm. Thus, the spacings between lines 5 and 7 were again 0.254 mm and between adjacent ones of lines 3, 0.508 mm. These dimensions provided an array of 1600 resistor elements requiring only 1202 connector lines.

A number of different electrical drive arrangements may be envisaged for the print head. Basically, however, the best arrangement is selectively to provide current return paths on lines 7 and to provide voltage source paths selectively on lines 3 and 5. Thus, if the left-most line 7 in FIG. 1 is driven, up to four of the print elements can be energized by selecting any, or all, of the leftmost pairs of lines 3 and 5 as voltage source paths. In order to reduce the instantaneous current requirements for the print head, the drive lines 7 may be driven either sequentially, line by line, or in blocks. Furthermore, if printing is performed on a continuously moving sheet, the voltage source lines 3 and 5 can be operated in timed relationship such that the print dots are formed along a substantially continuous line. If, for example, a sheet is moving upward relative to the print bars in FIG. 1, then, in order to achieve a continuous line across the sheet, print bar 2 is activated first, and shortly thereafter, at a time determined by the velocity of the sheet, print bar 1 is activated. This same principle applies, of course, when only portions of the print bars are activated to develop printed characters.

Figure 3:
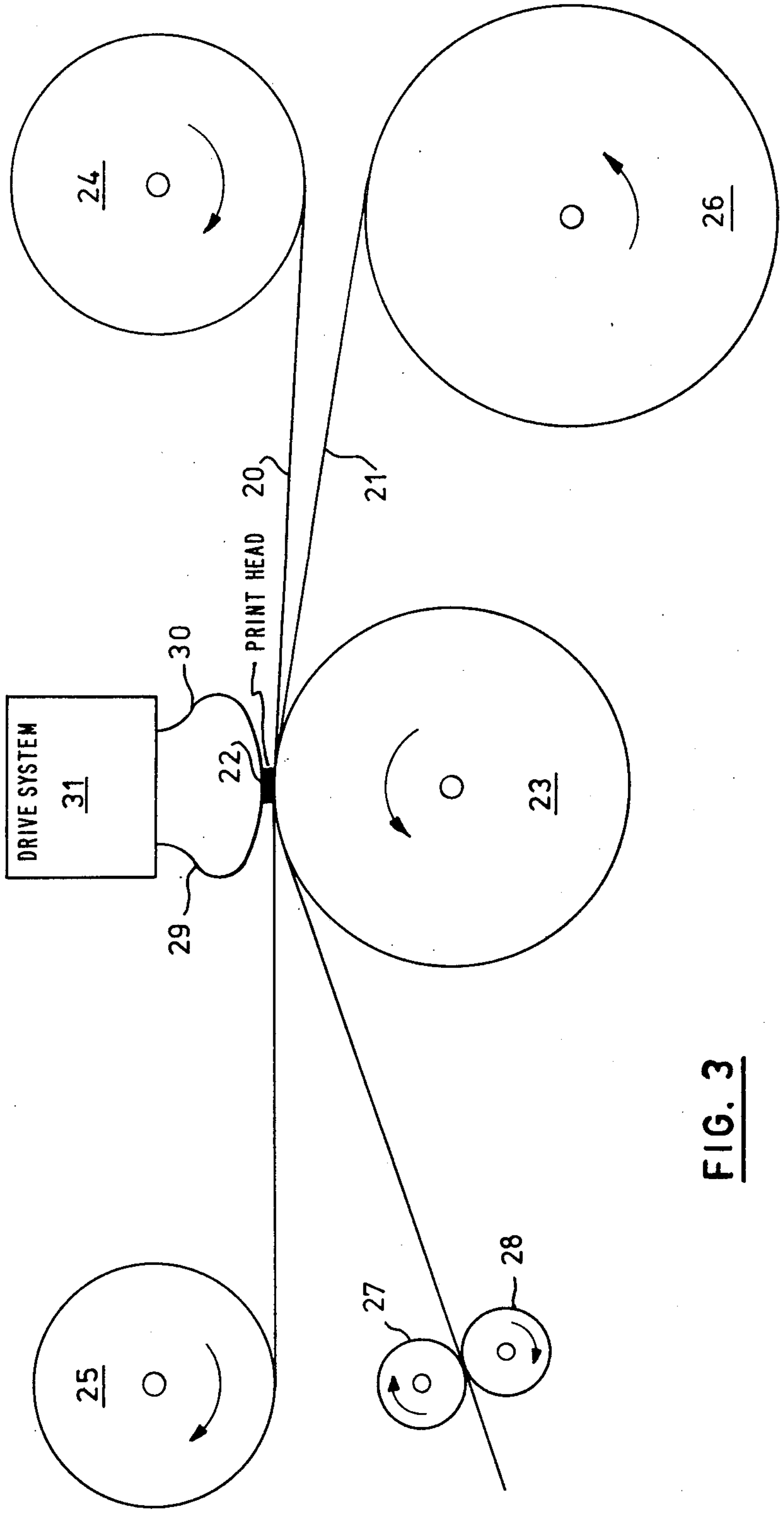
FIG. 3 is a schematic diagram of a printer incorporating a print head as shown in FIGS. 1 and 2.

FIG. 3 is a schematic diagram, not to scale, of a printer incorporating a print head of the type shown in FIGS. 1 and 2. In this printer, a web 20 of transfer material and a paper web 21 are sandwiched between the print head 22 and a backing roller 23. The transfer material comprises a mylar base carrying on its underside a layer of heat-transferrable ink. The transfer material is fed from a feed roller 24 to a take-up roller 25. The paper web is supplied from roll 26 and, after passing the print head is fed by a feed roller pair 27, 28 to an output device. This may be another roll or a sheet cutter and output tray. The print head 22 is connected by tape cables 29 and 30 to an electrical drive system 31. The webs of paper and transfer material are fed at the same velocity. As they pass between the print head and backing roller, the print bars in the head, which contact the mylar backing of the transfer web, are selectively energized to cause transfer of the ink to the paper web.

While the invention has been particularly shown and described with reference to a preferred embodiment, it will be understood by those skilled in the art that various changes in form and detail may be made without departing from the spirit and scope of the invention.

What is claimed is:

1. A thermal print head comprising first and second longitudinally extending, electrically resistive, continuous print bars positioned in parallel, a first and a second set of leads connected to the first and second bars respectively, each lead being individually connected to the associated bar at a position substantially equidistant from the connection positions of immediately adjacent leads, and a third set of leads of which each lead is individually connected to both bars at a position substantially midway between adjacent connections from leads of the first and second sets.

2. A thermal print head as claimed in claim 1 in which each lead connection extends across the full width of a bar.

3. A thermal print head as claimed in claim 1 in which the connections to the first bar are longitudinally staggered with respect to the connections to the second bar.

4. A thermal print head as claimed in claim 2 in which the connections to the first bar are longitudinally staggered with respect to the connections to the second bar.

5. A thermal print head comprising an electrically insulating substrate carrying a first row of equally spaced connector pads, a first row of connector leads extending in parallel from the first row of connector pads to a position at which they underlie, and connect to, a first electrically resistive, continuous, print bar longitudinally extending normal to the first row of connector leads, a second row of equally spaced connector leads extending in parallel from a second row of connector pads to a position at which they underlie, and connect to, a second electrically resistive, continuous, print bar longitudinally extending normal to the second row of connectors and in parallel with the first print bar, and a third row of equally spaced connector leads extending in parallel from a third row of connector pads and normal to the print bars to a position at which they underlie, and connect to, the first print bar, each lead in the third row including an extension which underlies and is connected to, the second print bar.

6. A thermal print head as claimed in claim 5 in which the first and second rows of connector leads are staggered with respect to each other along the longitudinal dimension of the print bars and the extension of each lead in the third row is skewed to effect substantially equal spacing between adjacent lead connections to each print bar.

7. A thermal print head as claimed in claim 6 in which said insulating substrate is mounted on a rigid base plate.

* * * * *